United States Patent [19]
Ohishi

[11] Patent Number: 5,271,964
[45] Date of Patent: Dec. 21, 1993

[54] PROCESS FOR MANUFACTURING ABRASIVE TAPE

[75] Inventor: Michihiro Ohishi, Sagamihara, Japan

[73] Assignee: Minnesota Mining and Manufacturing Company, St. Paul, Minn.

[21] Appl. No.: 890,659

[22] Filed: May 28, 1992

[30] Foreign Application Priority Data

Jun. 26, 1991 [JP] Japan .................... 3-154761
Jun. 26, 1991 [JP] Japan .................... 3-154762

[51] Int. Cl.$^5$ .......................... B05D 5/02; B24D 3/20
[52] U.S. Cl. ........................ 427/386; 51/293;
51/295; 51/298; 428/328; 428/329; 525/454;
525/528
[58] Field of Search .................. 427/386; 51/293, 295,
51/298; 428/328, 329, 413; 525/528, 454, 530,
533

[56] References Cited

U.S. PATENT DOCUMENTS 3,713,796  1/1973  Valerio et al. .................... 51/293
4,267,288  5/1981  Burkhart et al. .................. 525/438

(List continued on next page.)

FOREIGN PATENT DOCUMENTS 0227394  7/1987  European Pat. Off. .
429250   5/1991  European Pat. Off. .
674887   7/1979  U.S.S.R. .
1574445  6/1990  U.S.S.R. .
1648739  5/1991  U.S.S.R. .

OTHER PUBLICATIONS

EPO Search Report, For EP Application No. 92305261, Mar. 1993.

*Primary Examiner*—Terry J. Owens
*Assistant Examiner*—Erma Cameron
*Attorney, Agent, or Firm*—Gary L. Griswold; Walter N. Kirn; David L. Weinstein

[57] ABSTRACT

A process for manufacturing an abrasive tape comprising the steps of preparing a coating solution by mixing, as main constituents, abrasive grains, a binder, and a solvent, applying this coating solution on a substrate and drying the coating, and curing the binder, wherein the binder used in preparation of the tape as its essential components either:

I. (a) a polymer having repeating units of the formula

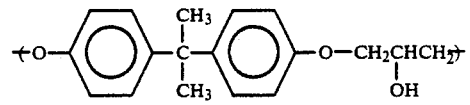

and having a number average molecular weight of 1,000 to 5,000

(b) a polyester resin containing in its molecule a condensate of an aromatic dicarboxylic acid or an aliphatic dicarboxylic acid or an aromatic dicarboxylic acid and an aliphatic dicarboxylic acid, and an aliphatic diol and having a number average molecular weight of 10,000 to 30,000 terminal OH groups and a glass transition point (Tg) of $-20°$ C. to $40°$ C., and (c) a polyfunctional isocyanate II. (a) a polymer having repeating units of the formula

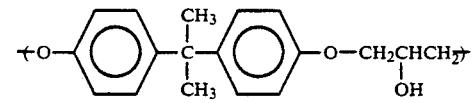

(b) a polyurethane resin having a number average molecular weight between 5,000 and 20,000 and terminal OH groups, and (c) a polyfunctional isocyanate.

(d) the component II (a) to II (b) ratio by weight being in the range 10:90 to 40:60.

19 Claims, 7 Drawing Sheets

U.S. PATENT DOCUMENTS

| | | | |
|---|---|---|---|
| 4,414,279 | 11/1983 | Bernelin et al. | 427/386 |
| 4,642,126 | 2/1987 | Zador et al. | 51/295 |
| 4,652,274 | 3/1987 | Boettcher et al. | 54/298 |
| 4,701,502 | 10/1987 | Kordomenos et al. | 525/530 |
| 4,751,138 | 6/1988 | Tumey et al. | 428/323 |
| 4,773,920 | 9/1988 | Chasman et al. | 51/295 |
| 4,786,691 | 11/1988 | Dervan et al. | 525/528 |
| 4,789,590 | 12/1988 | Sato et al. | 428/328 |
| 4,822,672 | 4/1989 | Yamaguchi et al. | 428/329 |
| 4,927,431 | 5/1990 | Buchanan et al. | 51/298 |
| 4,997,717 | 3/1991 | Rembold et al. | 478/413 |
| 5,011,513 | 4/1991 | Zador et al. | 51/295 |
| 5,014,468 | 5/1991 | Ravipati et al. | 51/292 |
| 5,089,032 | 2/1992 | Moran | 51/295 |
| 5,094,670 | 3/1992 | Imada | 51/293 |
| 5,135,546 | 8/1992 | Sato et al. | 51/295 |

PROCESS FOR MANUFACTURING ABRASIVE TAPE

BACKGROUND OF THE INVENTION

Priority is being claimed from Japan Application Nos. 154,761/91 and 154,762/91, both of which were filed on Jun. 26, 1991.

1. Field of the Invention

This invention relates to a process for manufacturing an abrasive tape that is suitable for finish lapping of precision electronic parts or precision machinery parts, for example, magnetic discs, magnetic heads, etc., precision surface finish abrasion of molds and other similar works.

2. Discussion of the Art

The surfaces of most precision electronic parts and precision machine parts are required to be finished to a high degree of accuracy with unevenness of micron or submicron order. For meeting this requirement, there are used lapping films or tapes having an abrasive layer formed on a substrate made of a film, synthetic paper, or the like by coating the substrate with a resin solution having dispersed therein inorganic particles of high hardness and drying the coating.

The abrasive layer in conventional abrasive tapes is generally formed by applying on a substrate a coating solution prepared by dispersing inorganic abrasive particles in a solution of a thermoplastic, thermosetting, or reactive resin as a binder, and conducting the appropriate aftertreatment according to the kind of the resin in the coating solution.

In most conventional abrasive tapes, polyester resin having a molecular weight of around 20,000 and crosslinked by a trifunctional isocyanate is used as binder.

Use of such a binder, however, because of low density of OH groups in polyester resin, tends to lower the rate of reaction with isocyanate, necessitating a long reaction time and a high reaction temperature, such as 36 hours at 70° C. and about 80 hours at 50° C. Further, when the film is wound up into a roll and cured at a high temperature, variation in film qualities such as cut performance and finishing characteristics is caused by variation of internal pressure developed by the winding tension and by variations in temperature distribution resulting in variation of product quality.

Also, abrasive tapes produced by said conventional method are low in crosslinking density of binder and vulnerable to change in quality by internal pressure of the roll in storage.

The present invention has made intensive studies of binder compositions capable of decreasing variation of quality during room temperature curing of abrasive tapes in a roll, and, as a result, discovered that it is possible to obtain an abrasive tape capable of greatly lessened variation of quality occurring during curing and suited for abrading of thin-film type magnetic discs by using a polyester resin having specific characteristics in place of the urethane resin described previously. One aspect of the present invention was achieved on the basis of this discovery.

In addition, the present inventor has made intensive studies of binders for abrasive tape and, as a result, discovered a binder which has sufficiently high reactivity to maintain a sufficiently high reaction rate even when the reaction temperature is lowered to room temperature; the binder also provides high crosslinking density. Another aspect of the present invention was achieved on the basis of such discovery.

SUMMARY OF THE INVENTION

In one aspect of the present invention there is provided a process for manufacturing an abrasive tape comprising the steps of preparing a coating solution by mixing, as main constituents, abrasive grains, a binder and a solvent, applying this coating solution on a substrate and drying the coating, and curing the binder, wherein the essential components used in preparation of said binder contain:

(A) an epoxy resin having the repeating unit:

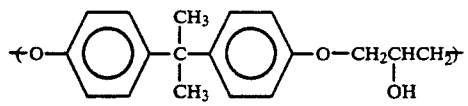

and a number average molecular weight of 1,000 to 5,000.

(B) a polyester resin containing in its molecule a condensate of an aromatic dicarboxylic acid and/or an aliphatic dicarboxylic acid and an aliphatic diol and having a number average molecular weight of 10,000 to 30,000, terminal OH groups and a glass transition temperature (Tg) of −20° C. to 40° C., and (C) a polyfunctional isocyanate.

In another aspect of the present invention, there is provided a process for manufacturing an abrasive tape comprising the steps of preparing a coating solution by mixing, as main constituents, abrasive grains, a binder and a solvent, applying said coating solution on a substrate and drying the coating, and removing said solvent and curing said binder, characterized in that the binder used in the preparation of the coating solutions contains:

(i) a polymer having repeating units of the formula:

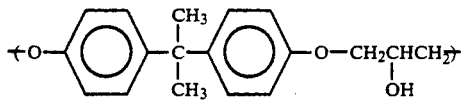

and an average molecular weight between 1,000 and 10,000;

(ii) a polyurethane resin having a number average molecular weight between 5,000 and 20,000 and terminal OH groups; and (iii) a polyfunctional isocyanate, wherein component (i) to component (ii) ratio by weight is in the range of 10:90 to 40:60.

As substrate for the abrasive tape according to the present invention, various kinds of plastic material such as polyethylene terephthalate, polypropylene, polycarbonate, acetate, polyvinyl chloride, etc., and films of aluminum and other materials can be favorably used.

DETAILED DESCRIPTION

Figure 1:
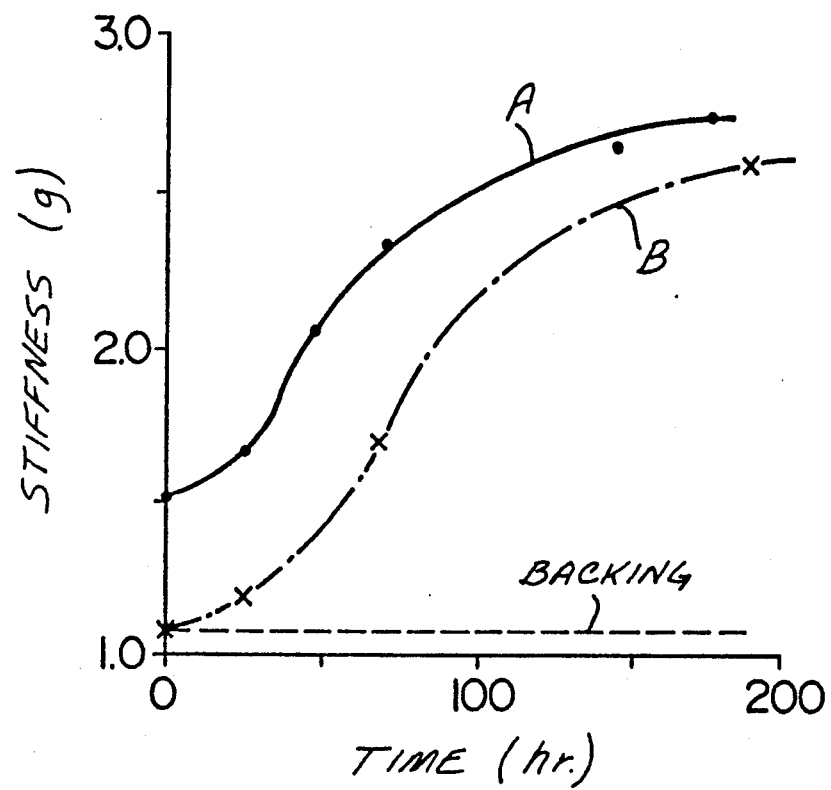
FIG. 1 is a graph showing the relation between curing time and stiffness of abrasive tapes.

The coating solution used for forming an abrasive layer on the substrate in said abrasive tape, which is alternatively referred to herein as lapping film, contains a binder of a specific composition as mentioned above. A binder that can be used in the present invention, which can meet said requirements and is variable in hardness as desired, is the one which contains:

(A) a polymer having a repeating unit of the formula:

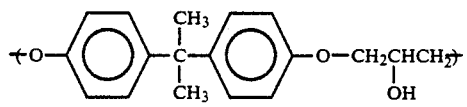

and having a number average molecular weight of 1,000 to 5,000, for example, solid epoxy resin "ESA 014" (average molecular weight: about 2,000, produced by Sumitomo Chemical Co., Ltd.), (B) a polyester resin containing in its molecule a structure of a condensate of an aromatic dicarboxylic acid (such as terephthalic acid or isophthalic acid), an aliphatic dicarboxylic acid (such as sebacic acid or azelaic acid), or an aromatic dicarboxylic acid and an aliphatic dicarboxylic acid, and an aliphatic diol (such as ethylene glycol or neopentyl glycol) and having a number average molecular weight of 10,000 to 30,000, preferably 15,000 to 30,000, terminal OH groups and a glass transition temperature (Tg) of −20° C. to 40° C., for example, polyester resin "VIRON 650" (average molecular weight: 20,000; Tg: about 14° C., produced by Toyo Boseki Co., Ltd.), and (C) a polyfunctional isocyanate, for example, "COLONATE L" (produced by Nippon Polyurethane Co., Ltd.), and which can be crosslinked and cured at room temperature.

The polymer (A) used in the foregoing composition needs to have a number average molecular weight (Mn) in the range of 1,000 to 5,000, preferably 1,000 to 3,000. If Mn is over 6,000, compatibility with polyester resin is poor as shown in Table 1 and phase separation takes place to make the mixture unusable. If Mn is less than 1,000, the number of OH groups of one molecule becomes small, thereby providing unsatisfactory three dimensional crosslinking density.

TABLE 1

| Influence of molecular weight on compatibility of epoxy resin with polyester resin | | | | |
|---|---|---|---|---|
| | | Compatability with polyester resin | | |
| Epoxy resin | Mn | PER I[a] | PER II[b] | PER III[c] |
| "PKHH" (phenoxy resin) | >10,000 | poor | poor | poor |
| "ESA019" | 6,000 | poor | somewhat poor | poor |

TABLE 1-continued

| Influence of molecular weight on compatibility of epoxy resin with polyester resin | | | | |
|---|---|---|---|---|
| | | Compatability with polyester resin | | |
| Epoxy resin | Mn | PER I[a] | PER II[b] | PER III[c] |
| "ESA017" | 4,000 | poor | good | good |
| "ESA014" | 2,000 | good | good | good |

[a]PER I: "VIRON 650" resin, available from Toyo Boseki Co., Ltd.; Tg ≈ 14° C.; Mn ≈ 20,000
[b]PER II: "VIRON GK 570" resin, available from Toyo Boseki Co., Ltd.; Tg ≈ −1° C.; Mn ≈ 15,000
[c]PER III: "VIRON GK 540" resin, available from Toyo Boseki Co., Ltd.; Tg ≈ −5° C.; Mn ≈ 24,000

Also, the polyester resin (B) used in the present invention is required to have Mn in the range of 10,000 to 30,000 preferably 15,000 to 30,000. If Mn is over 30,000, it gives too low crosslinking density. And if Mn is less than 10,000, resin fluidity lingers even after the solvent has been dried away. As for glass transition temperature (Tg) of the polyester resin (B), too low Tg causes insufficient hardness before crosslinking and too high Tg impairs flexibility of the abrasive tape. In view of the above, Tg should be in the range of −20° C. to 40° C. Terminal OH groups are necessary for cross-linking. Additional branched OH groups on the side chain cause no problem for the binder used in the present invention.

As polyfunctional isocyanate (C), there can be used the isocyanate compounds having at least two isocyanate groups, but usually it is preferred to use a trifunctional low-molecular weight isocyanate obtained by reacting one mole of triol and 3 moles of diisocyanate, because of possibility of crosslinking between straight chain polyester resin.

Another binder that can be used in the present invention contains:

(i) a polymer having repeating units of the formula:

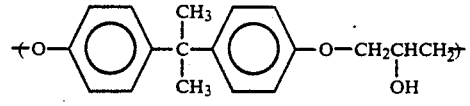

and an average molecular weight between 1,000 and 10,000;

(ii) a polyurethane resin having a number average molecular weight between 5,000 and 20,000 and terminal OH groups; and (iii) a polyfunctional isocyanate, wherein component (i) to component (ii) ratio by weight is in the range of 10:90 to 40:60.

For obtaining a binder that can meet the specified requirements and can be adjusted to a desired hardness, a first polymer (hard polymer) having repeating units of the formula:

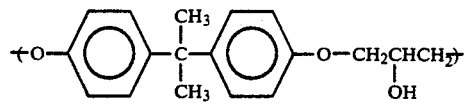

and a second polymer such as soft polyurethane resin containing polycaprolactone as repeating unit and having terminal OH groups are mixed in a ratio of 10:90 to 40:60, and a polyfunctional isocyanate is further added to induce crosslinking by reaction of OH groups in the first and second polymers with said isocyanate.

The first polymer used in the polyurethane-containing binder of the present invention needs to have a molecular weight (number average molecular weight) between 1,000 and 10,000. Use of a polymer having a molecular weight exceeding 10,000 (for example, phenoxy resin "PKHH" produced by Union Carbide Corporation of the U.S.) deteriorates compatibility of the system, resulting in reduced dispersibility of the abrasive grains. On the other hand, when the molecular weight is below 1,000, the number of OH groups in the molecule become small, thereby giving unsatisfactory three dimensional crosslinking density.

The second polymer should have a molecular weight in the range from 5,000 to 20,000. When its molecular weight exceeds 20,000, the crosslinking density is lowered, and when the molecular weight is less than 5,000, resin fluidity lingers even after the solvent has been removed with drying.

As solvent for the coating solution applied in this invention, there can be used ketone solvents such as methyl isobutyl ketone, methyl ethyl ketone (MEK) and cyclohexanone, ester solvents such as ethyl acetate and butyl acetate, aromatic hydrocarbon solvents such as benzene, toluene and xylene, dioxane, tetrahydrofuran, dimethylformamide, dimethyl sulfoxide and the like. These solvents may be used either singly or in combination for preparing the desired coating solution.

As abrasive grains which are an essential constituent of the coating solution for forming said abrasive layer, there can be used finely divided powder of such materials as aluminum oxide, silicon carbide, silicon nitride, zirconium oxide, chromium oxide, iron oxide, diamond, boron nitride, emery and the like. When the abrasive grains used are smaller than 0.1 μm in diameter, the produced abrasive tape proves poor in abrasive performance. When using the abrasive grains greater than 100 μm in diameter, it becomes impossible to obtain an abrasive tape that can be used to provide a high-precision finish. Therefore, the abrasive grains used in the present invention are the ones having a diameter of usually 0.1 to 100 μm, preferably about 0.1 to about 60 μm.

The coating solution used for forming said abrasive layer may contain where necessary a suitable additive or additives such as dispersant, antistatic agent, etc.

In said coating solution, usually abrasive grains are contained in an amount of about 100-400 parts by weight to 100 parts by weight of binder, and the coating solution is coated on an abrasive tape substrate to a thickness of about 10-50 μm.

Preferably a coupling agent is contained in said coating solution for enhancing adhesion between abrasive grains and binder. The amount of such a coupling agent contained in the coating solution is in the range of about 0.1-10% by weight, preferably about 1.5-5% by weight based on the weight of abrasive grains.

Curing of the binder can be conducted at room temperature, i.e. 25° C.±15° C.

EXAMPLES

The structure of the abrasive tape according to the present invention will be illustrated more concretely below by showing the manufacturing examples.

Binder resin containing polyester component

The structures of the component resins of the binder are shown below.

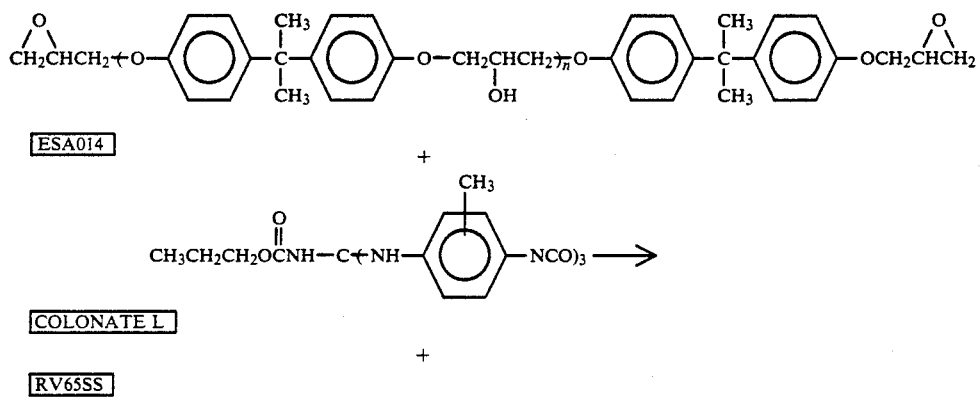

The structure of the product RV65SS, which is solution of "VIRON 650" resin in a solution of methyl ethyl ketone and toluene is not shown.

Properties of binder resins containing polyester component

The changes, of glass transition temperature Tg and storage modulus E' (at 25° C.) with variation of epoxy resin "ESA014" polyester resin ("VIRON 650") ratio are shown in Table 2. The numerical values given in the table are the ones obtained from measurement with "RSA II" device (Rheometrics Inc.) after curing at 25° C. for one week. The amount of polyfunctional isocyanate ("COLONATE L") calculated from the following equation (1):

Amount of "COLONATE L" polyfunctional isocyanate (NCO mol)=(OH mol of "ESA 014" resin)
×1+(OH mol of "VIRON 650" resin)×5     (1)

TABLE 2

| Ratio (by wt.) of "ESA014" resin/ "VIRON 650" resin | E' at 25° C. (dyn/cm$^2$) | Tg (°C.) |
|---|---|---|
| 10/90 | 1.03 × 10$^{10}$ | 48 |
| 20/80 | 1.94 × 10$^{10}$ | 56 |
| 30/70 | 2.76 × 10$^{10}$ | 60 |

Table 2 shows that E' can be controlled in the range of 1.03×10$^{10}$ to 2.76×10$^{10}$ dyn/cm$^2$ by changing the "ESA014" resin/"VIRON 650" resin ratio. Since change of hardness of the binder can be understood from change of glass transition point Tg in Table 2, it can be utilized as a standard for setting up formulations.

Binder resin containing polyurethane component (1) Raw materials

The following materials were used as essential components of the binder:

(a) Epoxy resin "ESA019", produced by Sumitomo Chemical Co., Ltd.;

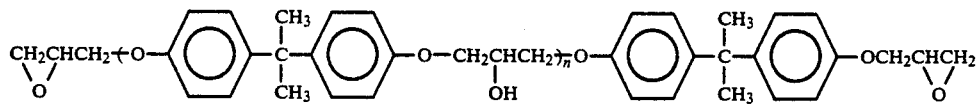

(n ≈ 12)

(b) Urethane resin ("EA1443", produced by Daicel Chemical Industries Co., Ltd.)
(c) Trifunctional isocyanate ("COLONATE L", produced by Nippon Polyurethane Co., Ltd.)

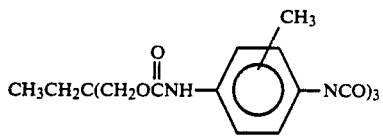

Properties of binder resins containing polyurethane component

The changes of glass transition temperature Tg and storage modules E' (at 25° C.) with variation of epoxy resin ("ESA019")/urethane resin ("EA1443") ratio are shown in Table 3. The numerical values given in the table are those obtained from measurement with "RSA II" device (Rheometrics Inc.) after curing at 25° C. for one week. The amount of the polyfunctional isocyanate ("COLONATE L") was calculated from the following equation (2): Amount of "COLONATE L" polyfunctional isocyanate (NCO mol) = (OH mol of "ESA019" resin) × 1 + (OH mol of "EA1443" resin) × 3 ... (2)

TABLE 3

| Ratio (by wt.) of "ESA019" resin/ "EA1443" resin | E' (dyn/cm$^2$) | Tg (°C.) |
|---|---|---|
| 10/90 | 1.82 × 10$^8$ | 0 |
| 25/75 | 2.11 × 10$^9$ | 44 |
| 30/70 | 4.89 × 10$^9$ | 49 |
| 35/65 | 1.52 × 10$^{10}$ | 64 |
| 40/60 | 1.91 × 10$^{10}$ | 65 |

Table 3 shows that at least E' can be controlled in the range of $1.82 \times 10^8$ to $1.91 \times 10^{10}$ dyn/cm$^2$ by changing the "ESA019" resin/"EA1443" resin ratio. Since change of hardness of the binder can be understood from change of glass transition point Tg shown in Table 3, it can be utilized as a standard for setting up formation.

Figure 5A:
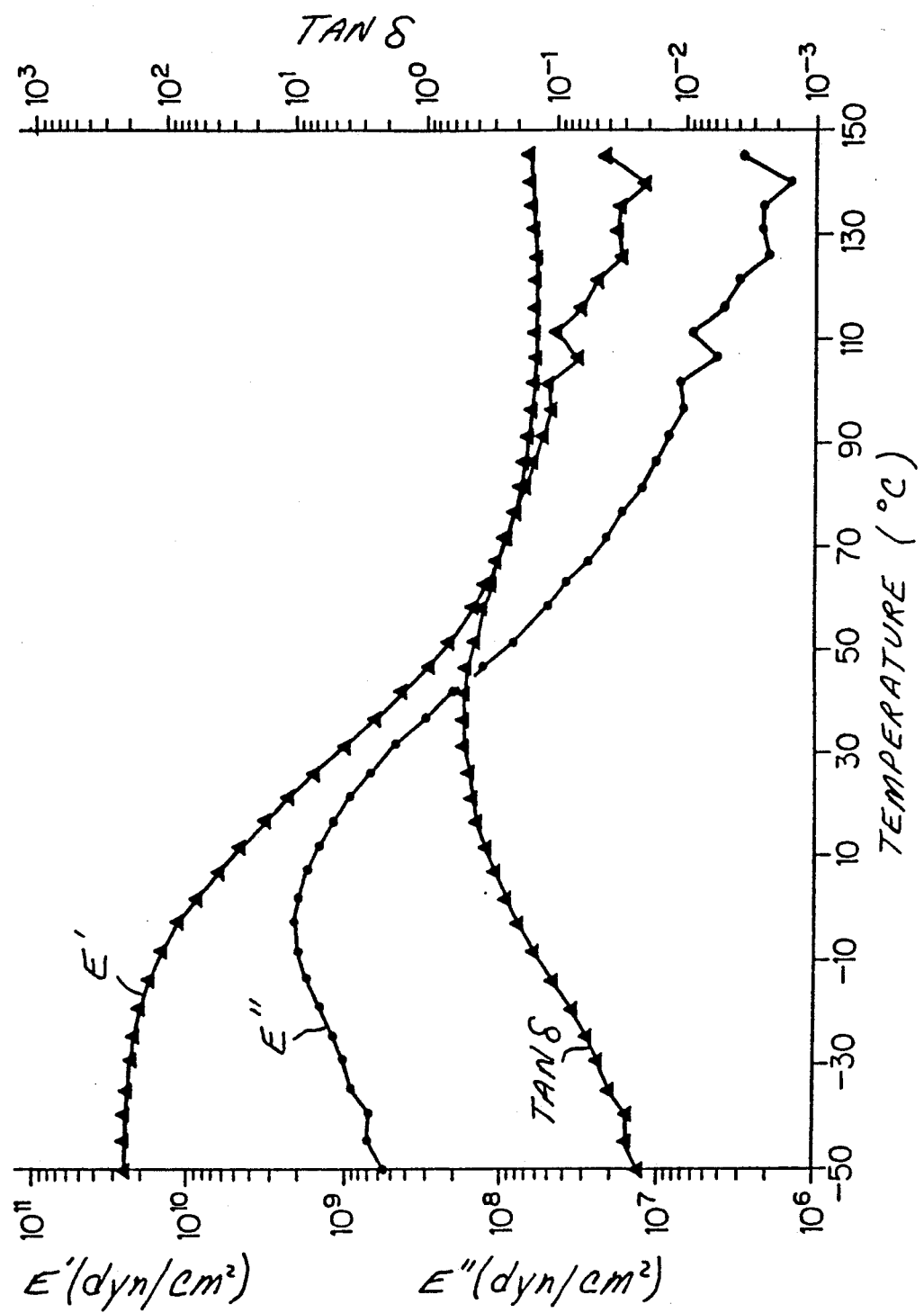
FIG. 5 are graphs showing the relation between viscoelasticity and temperature wherein (a) is a graph showing the change of viscoelasticity by temperature in one embodiment of the present invention, and (b) is a graph showing the change of viscoelasticity by temperature of lapping film using a conventional polyester-based binder.
Figure 5B:
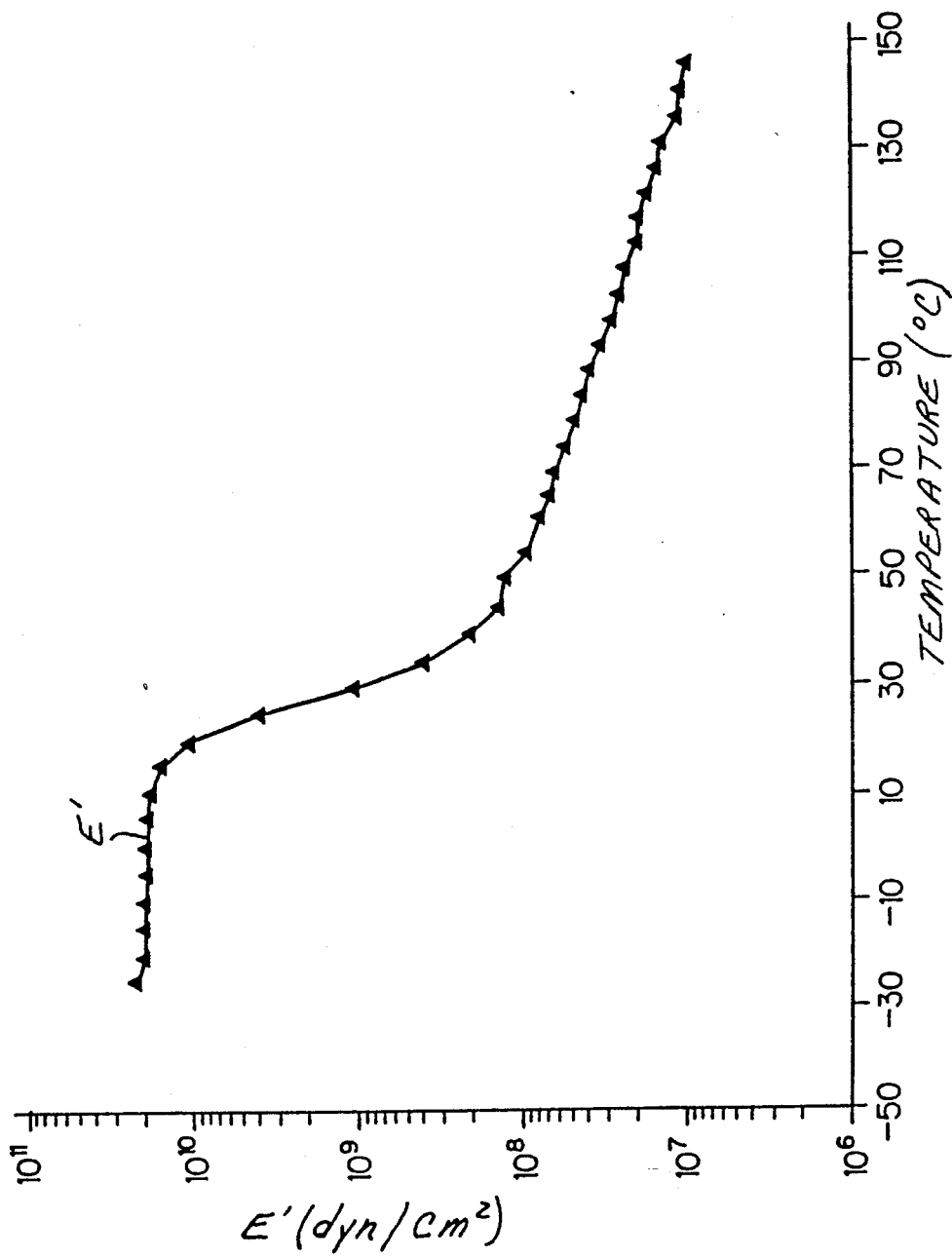

The change of viscoelastic property of a 25/75 mixture of "ESA019" resin/"EA1443" resin by temperature is plotted in FIG. 5(a). It is seen that this binder has substantially same E' at room temperature but higher E' in the rubber region as compared with the currently used polyester resin binder "PE307" crosslinked with trifunctional isocyanate, "COLONATE L", whose viscoelastic property is plotted in FIG. 5(b). This indicates that the binder prepared according to the present invention has high crosslinking density, warranting little change of quality of the product during its storage.

Preparation of abrasive tape having a polyester-based binder

A coating solution of the composition shown in Table 4 was coated on a 24 μm thick polyester film over a width of 50 cm and a length of about 1,200 m by a roll coater, and after drying, the coated film was wound up

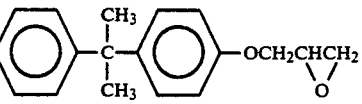

on a 6-inch diameter aluminum core and then cured at 25° C.

TABLE 4

| Formulation of abrasive tape (Sample A) | |
|---|---|
| Raw materials | Amount (parts by weight) |
| Epoxy resin ("ESA014") | 2.84 |
| Polyester resin ("VIRON 650") | 25.61 |
| MEK | 60.55 |
| Toluene | 29.88 |
| γ-mercaptopropyltrimethoxysilane (A-189, Union Carbide Corporation) | 1.00 |
| WA #5000 (2.5 μm Al$_2$O$_3$ abrasive grains) | 100.00 |
| Trifunctional isocyanate ("COLONATE L") | 7.93 |
| Total | 227.79 |

Properties of abrasive tape having a polyester-based binder

The relation between reaction time and stiffness (at 25° C.) of sample A of this invention and sample B (a comparative example) prepared by using polyurethane resin instead of polyester resin for comparison's sake (the formulation of sample B being shown in Table 5) is shown in FIG. 1.

TABLE 5

| Formulation of abrasive tape (Sample B, comparative example) | |
|---|---|
| Raw materials | Amount (Parts by Weight) |
| Epoxy resin ("ESA019") | 8.32 |
| Epoxy resin ("EA1443") (55% solids in MEK/toluene solution) | 28.10 |
| MEK | 74.30 |
| γ-mercaptopropyltrimethoxysilane (A-189) (A-189, Union Carbide Corporation) | 4.00 |
| WA #4000 (3 μm Al$_2$O$_3$ abrasive grains) | 100.00 |
| Trifunctional isocyanate ("COLONATE L") | 14.15 |
| Total | 228.87 |

FIG. 1 shows that, in sample B, which is described by Curve B, the coating layer is very soft in the early phase of curing and substantially the same as the substrate in stiffness, whereas in sample A, which is described by Curve A, the coating layer has a certain degree of stiffness from the beginning of reaction. This indicates that sample A has resistance force to internal pressure in the roll and is resistant to the occurrence of change of quality.

Figure 2:
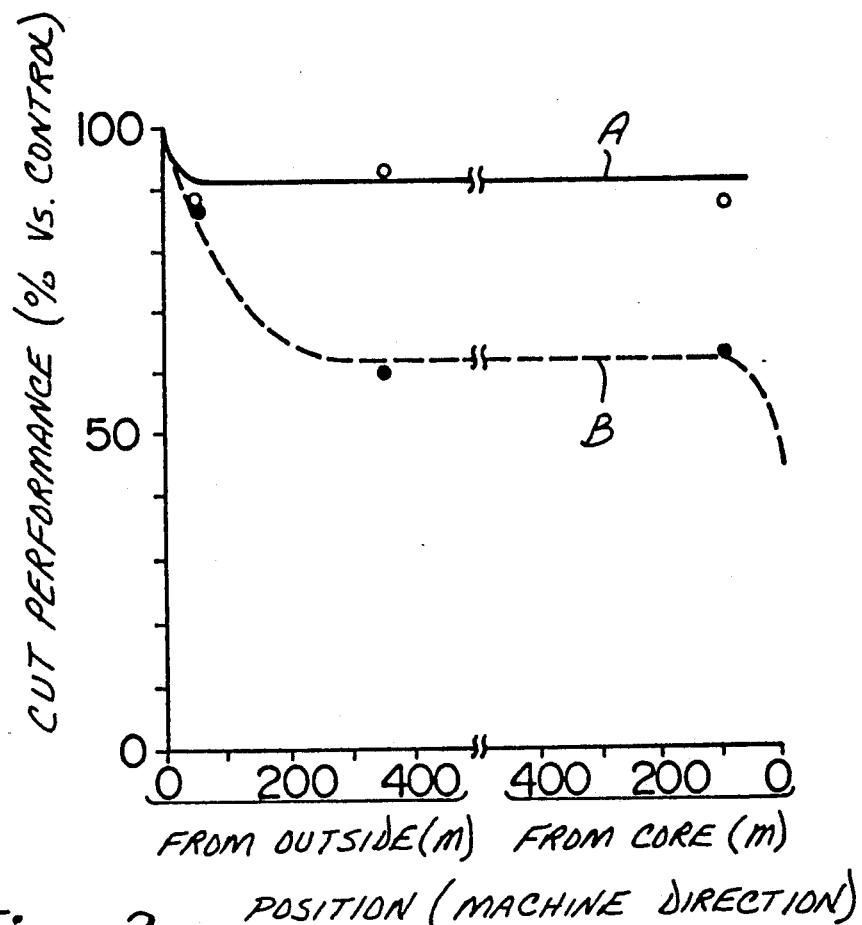
FIG. 2 is a graph showing change in finishing characteristics of abrasive tapes according to the position in the roll of film in the machine direction.
Figure 3:
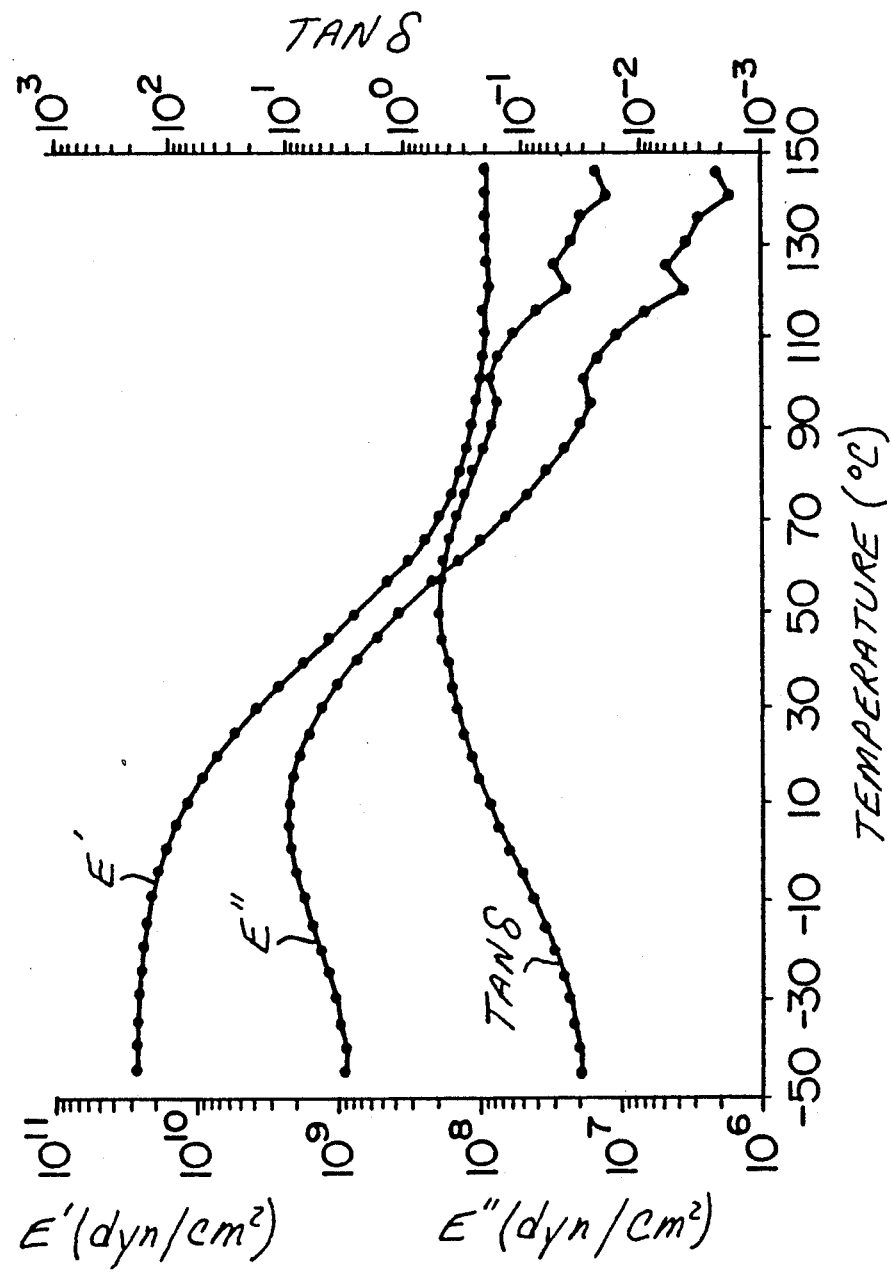
FIG. 3 and FIG. 4 are graphs showing the relation between viscoelasticity of the binders in an abrasive tape of this invention.
Figure 4:
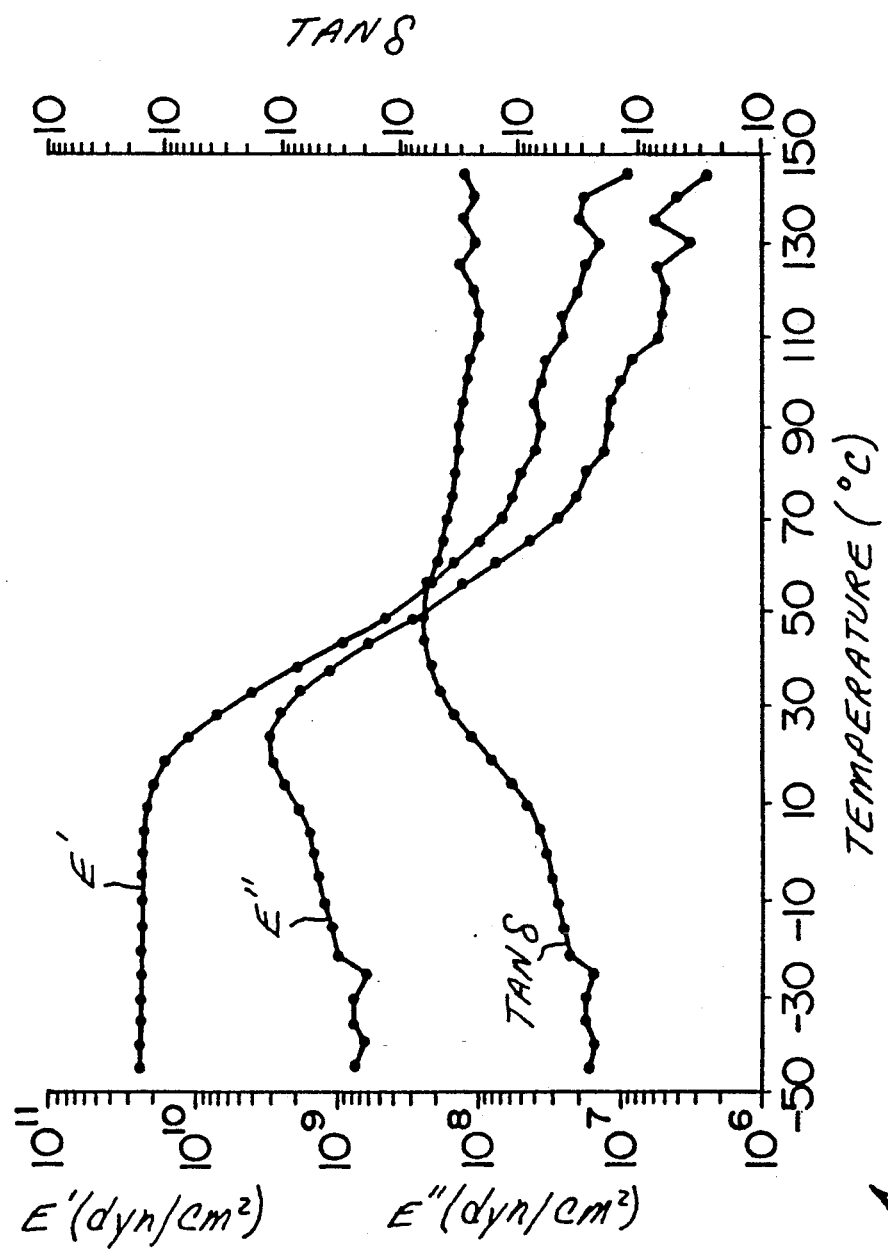

FIG. 2 shows the relationship between finished surface roughness and position in the roll of abrasive tape in the machine direction when the nip surfaces of the hard disc substrates were lapped by using sample A, which is described by Curve A, and sample B, which is described by Curve B. Both of sample A and sample B were wound into a roll and both were cured at 25° C. for one week.

FIG. 2 shows that this invention can greatly reduce change in finishing characteristics caused by internal pressure in the roll during curing at room temperature in the state of a roll.

Effect of the Invention

The abrasive layer of the abrasive tape film having a polyester-based binder produced according to the process of this invention has certain hardness from the beginning of curing and is therefore resistant to change by internal pressure in the roll during curing at room temperature in the state of a roll, so that variation of quality in cut performance and in finishing characteristics of the abrasive tape can be decreased and finds particularly useful application to abrasion of thin-film type magnetic discs.

Preparation of abrasive tape having a polyurethane-based binder

Coating solutions of the compositions shown in Table 6 was coated on a 24 μm thick polyester film over a width of about 10 cm and a length of about 50 m by a knife coater, and after drying, the coated film was wound up on a 3 inch-diameter PVC core and cured.

TABLE 6

| Formulation of Lapping Films (Samples C and D) | | |
|---|---|---|
| | Amount (parts by weight) | |
| Component materials | Sample C | Sample D |
| Epoxy resin ("ESA019") (50% MEK solution) | 55.60 | 49.93 |
| Epoxy resin ("EA1943") (55% MEK/toluene soln.) | 75.78 | 84.29 |
| MEK | 146.04 | 197.93 |
| γ-mercaptopropylmethoxy-silane (A-189, Union Carbide Corporation) | 4.00 | 4.00 |
| WA #4000 (3 μm Al₂O₃ abrasive grains) | 300.000 | 300.00 |
| Trifunctional isocyanate ("COLONATE L") | 44.91 | 42.44 |
| Total | 626.328 | 678.59 |

The curing conditions for each sample are shown in Table 7.

TABLE 7

| Winding tension and curing conditions | | |
|---|---|---|
| Sample | Curing conditions | Ratio (by wt.) of "ESA019" resin/"EA1443" resin |
| C | 70° C., 36 hr | (40/60) |
| D | room temp., 7 days | (35/65) |

Properties of abrasive tape having a polyurethane-based binder

Figure 6:
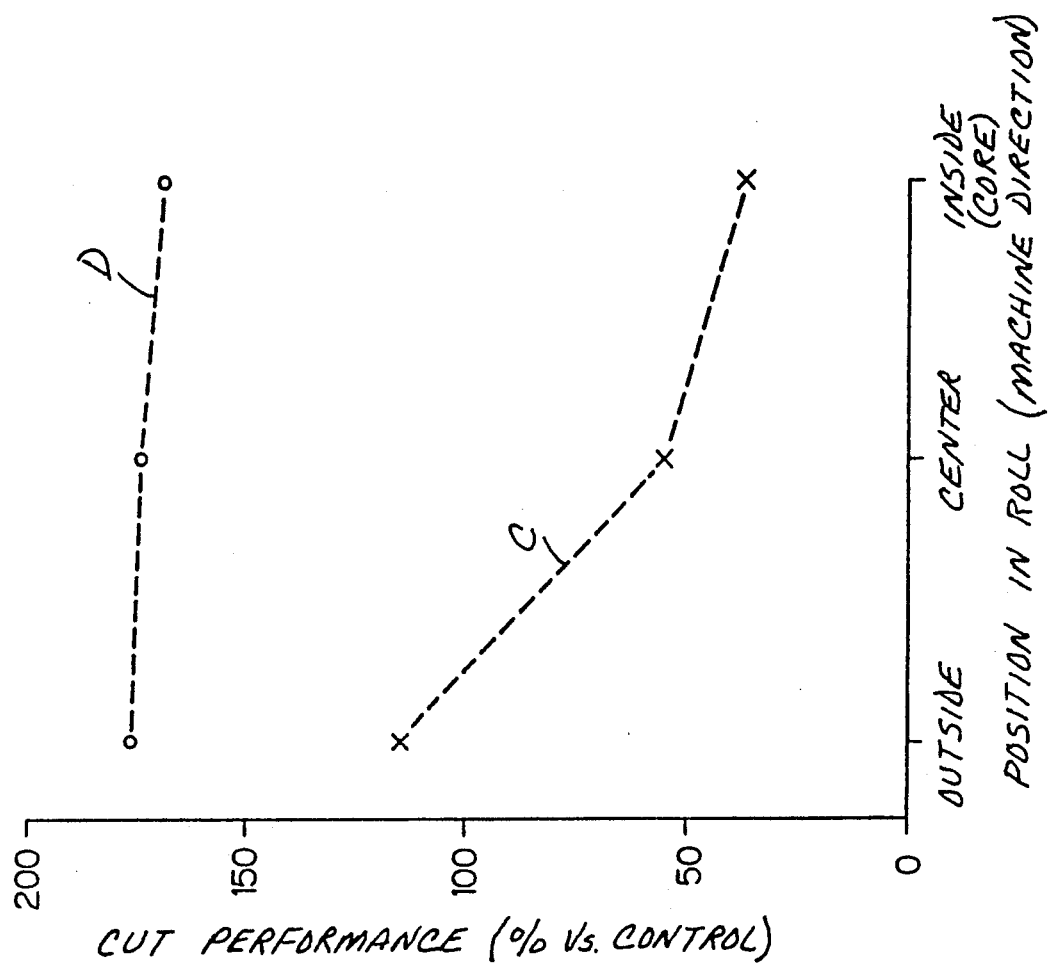
FIG. 6 is a graph showing the relation between cut performance of abrasive tapes of this invention and position in the roll of film.

Brass was sanded by using the abrasive tape of samples C and D, in a belt abrasion test, and the results were plotted in FIG. 6. Sample C is described by Curve C; sample D is described by Curve D. FIG. 6 shows that the variation of cut performance along the machine direction within the roll was lessened by lowering the curing temperature from 70° C. to room temperature. Also, it was found that the variation of Sample D, which was cured at room temperature, was less than that of Sample C, which was cured at 70° C., in spite of the softer binder.

Effect of the Invention

The abrasive layer of the abrasive tape having a polyurethane-based binder produced according to the process of this invention has a structure in which the abrasive particles are bound with each other by a binder having the specific compositions set forth in the claims and cured at room temperature, so that the abrasive tape of this invention has high crosslinking density of binder, suffers little variation of quality according to the position in the roll of tape during and after storage as a finished product and thus has good storage stability.

What is claimed is:

1. A process for manufacturing an abrasive tape comprising the steps of preparing a coating solution by mixing, as main components, abrasive grains, a binder and a solvent, applying said coating solution on a substrate and drying the coating, and curing the binder, wherein the binder used in the preparation of said coating solution comprises the following ingredients in amounts effective to form a binder:

(A) a polymer having repeating units of the formula:

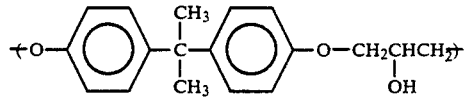

and having an number average molecular weight of 1,000 to 5,000, (B) a polyester resin containing in its molecule a condensate of an aromatic dicarboxylic acid or an aliphatic dicarboxylic acid or both, and an aliphatic diol and having a number average molecular weight of 10,000 to 30,000, terminal OH groups and a glass transition point (Tg) of −20° C. to 40° C., and (C) a polyfunctional isocyanate.

2. The process of claim 1 wherein said polymer (A) is an epoxy resin.

3. The process of claim 1 wherein said polyester resin (B) has a number average molecular weight of from 15,000 to 30,000.

4. The process of claim 1 wherein said polyfunctional isocyanate has three isocyanate groups.

5. The process of claim 1 wherein said solvent comprises a ketone solvent.

6. The process of claim 1 wherein said abrasive grains have a diameter of from about 0.1 to about 100 μm.

7. The process of claim 1 wherein the coating solution contains from 100 to 400 parts by weight abrasive grains to 100 parts by weight binder.

8. The process of claim 1 wherein the coating solution further contains a coupling agent.

9. The process of claim 8 wherein the coupling agent is present at a concentration of 0.1 to 10% by weight, based on the weight of abrasive grains.

10. A process for manufacturing an abrasive tape comprising the steps of preparing a coating solution by mixing, as main constituents, abrasive grains, a binder and a solvent; applying said coating solution on a substrate and drying the coating; and removing said solvent and curing said binder, wherein the binder used in the preparation of said coating solution comprises the following ingredients in amounts effective to form a binder:

(i) a polymer containing repeating units of the formula:

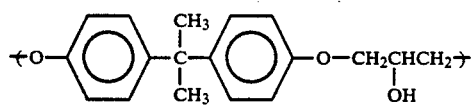

and having an average molecular weight between 1,000 and 10,000;

(ii) a polyurethane resin having a number average molecular weight between 5,000 and 20,000 and terminal OH groups; and (iii) a polyfunctional isocyanate, wherein the component (i) to component (ii) ratio by weight is in the range of 10:90 to 40:60.

11. The process of claim 10 wherein said solvent comprises a ketone solvent.

12. The process of claim 10 wherein said abrasive grains have a diameter of from about 0.1 to about 100 μm.

13. The process of claim 10 wherein the coating solution contains from 100 to 400 parts by weight abrasive grains to 100 parts by weight binder.

14. The process of claim 10 wherein the coating solution further contains a coupling agent.

15. The process of claim 14 wherein the coupling agent is present at a concentration of 0.1 to 10% by weight, based on the weight of abrasive grains.

16. The process of claim 10 wherein said polyfunctional isocyanate has three isocyanate groups.

17. The process of claim 10 wherein said polyurethane resin contains polycaprolactone as a repeating unit.

18. The process of claim 1 wherein said curing step is conducted at a temperature ranging from 10° C. to 40° C.

19. The process of claim 10 wherein said curing step is conducted at a temperature ranging from 10° C. to 40° C.

* * * * *

UNITED STATES PATENT AND TRADEMARK OFFICE
CERTIFICATE OF CORRECTION

PATENT NO. : 5,271,964
DATED : December 21, 1993
INVENTOR(S) : Ohishi

It is certified that error appears in the above-indentified patent and that said Letters Patent is hereby corrected as shown below:

Columns 5-6, middle of the page, "COLONATE L" formula should be:

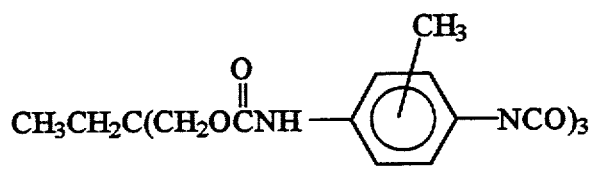

Signed and Sealed this

Eighth Day of November, 1994

Attest:

BRUCE LEHMAN

Attesting Officer     Commissioner of Patents and Trademarks